United States Patent [19]

Marchant

[11] 4,180,484

[45] Dec. 25, 1979

[54] CERAMIC COMPONENT FOR ELECTRODES

[75] Inventor: David D. Marchant, Richland, Wash.

[73] Assignee: The United States of America as represented by the United States Department of Energy, Washington, D.C.

[21] Appl. No.: 915,419

[22] Filed: Jun. 14, 1978

[51] Int. Cl.$^2$ ............................................. H01B 1/08
[52] U.S. Cl. .................................. 252/521; 106/732; 310/11
[58] Field of Search ...................... 252/521; 106/73.2; 310/11

[56] References Cited

U.S. PATENT DOCUMENTS

| | | | |
|---|---|---|---|
| 4,093,879 | 6/1978 | Marchant et al. | 310/11 |
| 4,128,776 | 12/1978 | Boquist et al. | 310/11 |

FOREIGN PATENT DOCUMENTS 1491361  11/1977  United Kingdom .

*Primary Examiner*—E. Suzanne Parr
*Attorney, Agent, or Firm*—R. V. Lupo; Frank H. Jackson; James W. Weinberger

[57] ABSTRACT

A ceramic component suitable for preparing MHD generator electrodes consists of $HfO_2$ and sufficient $Tb_4O_7$ to stabilize at least 60 volume percent of the $HfO_2$ into the cubic structure. The ceramic component may also contain a small amount of $PrO_2$, $Yb_2O_3$ or a mixture of both to improve stability and electronic conductivity of the electrode. The component is highly resistant to corrosion by molten potassium seed and molten coal slag in the MHD fluid and exhibits both ionic and electronic conductivity.

6 Claims, No Drawings

CERAMIC COMPONENT FOR ELECTRODES

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a ceramic component which can be used for the preparation of electrodes suitable for use as current collectors in the channel of a magnetohydrodynamic (MHD) generator.

The environmental conditions within an operating MHD channel in which the electrodes must function are very severe, and strenuous physical demands are placed on these electrodes. The plasma, which may be either an ionized gas or an inert gas seeded with an ionizing agent such as potassium, may reach temperatures up to 2800° C., while the surface of the electrode may reach about 2000° C. However, since the electrodes are attached to open rectangular frames which are generally made of copper, the electrode-frame temperatures can be no more than about 600°–1000° C. Thus, the electrodes must be capable of withstanding a temperature differential between electrode-plasma interface and the electrode-frame interface of up to about 1400° C. The electrode must be able to withstand erosive forces since the plasma as it passes through the duct may approach or even exceed sonic velocity. The electrode must either be protected from oxidation or be prepared from oxidation-resistant materials since many plasmas, depending upon the particular fluid and its source, are slightly oxidizing at operating temperatures. The electrode must also be able to withstand the highly corrosive effects of gaseous of molten potassium and molten coal slag when present in the fluid. The electrodes must be able to withstand the effects of electrochemical reactions which occur due to the passage of an electric current through the anode and cathode in the presence of an electrolyte, i.e., the potassium seeded coal slag. Finally, the electrode must be constructed of materials which are electrically conductive at the normal operating temperature of the electrode and which can withstand the thermal shock of sudden heating or cooling due to generator malfunction without the electrode separating from the channel or without the upper layers spalling from the remainder of the electrode. Thus, it is a problem to find a material or materials and an electrode design from which electrodes can be made which can withstand the rigor of such an environment.

A number of refractory materials have been suggested as components for electrodes. These materials include the magnesia-chromia and magnesia-alumina spinels doped with iron or alkaline-earth oxides, magnesium aluminum ferrous ferrite (0.25 $Fe_3O_4$ .0.75 $MgAl_3O_4$) and magnesia-doped lanthanum chromite ($La_{0.95}Mg_{0.05}CrO_3$). Compositions which appear to be most resistive to the hot plasmas are those which are based on zirconia or hafnia. However, since the conductivity of these materials is ionic rather than electronic, they are subject to an electrochemical reaction which eventually destroys the electrodes when placed in a magnetic field. Also, these materials are electrically resistive below about 1400° C. and thus require means for current leadout at lower temperatures. To overcome problems of conductivity and high-temperature phase-change, a number of materials such as yttria, ceria, neodymia, praseodymia, calcium oxide and magnesium oxide are added in small amounts to partially stabilize the hafnia or zirconia and improve electrical conductivity. For example, electrodes of hafnium containing about 8 to 10 mole percent yttria and 6 to 10 mole percent ceria have been prepared. While these and similar electrodes functioned, they are still subject to electrochemical reaction in a high-temperature molten potassium and coal slag environment, so that within the environment of an MHD channel the electrodes could not be expected to last for any substantial period of time.

SUMMARY OF THE INVENTION

It has been found that the addition of terbium as a stabilizer to hafnia provides a ceramic component from which electrodes can be prepared which are substantially more corrosion-resistant than many other electrode materials while meeting many of the other hereinbefore mentioned requirements desirable in a long-lived effective electrode. The invention therefore is a ceramic component for an MHD generator electrode consisting of hafnia and a minor amount of $Tb_4O_7$, the $Tb_4O_7$ being present in an amount effective to stabilize at least 60 volume percent of the hafnia in the cubic structure. The ceramic component may also contain a small amount of $PrO_2$, $Yb_2O_3$ or a mixture thereof to further improve electronic conductivity of the electrode.

It is therefore the object of the invention to provide a ceramic component for MHD electrodes which is better able to withstand the electrochemical interactions of an operating MHD channel than other ceramic materials while meeting the other criteria for MHD electrodes.

DETAILED DESCRIPTION OF THE PREFERRED EMBODIMENT

This and other objects of the invention may be met by a ceramic component consisting of about 90 mole percent $HfO_2$ and about 10 mole percent $Tb_4O_7$ as a stabilizer. Alternatively, the ceramic component may consist of about 85 mole percent $HfO_2$, about 5 mole percent $Tb_4O_7$, about 5 mole percent $PrO_2$ and about 5 mole percent $Yb_2O_3$.

The amount of Tb to be added to the hafnia should be an amount effective to stabilize at least 60 volume percent of the $HfO_2$ into the cubic structure. Therefore, if terbium peroxide ($Tb_4O_7$) is used to stabilize the hafnia, the component should contain at least 5 mole percent and may contain up to 30 mole percent, perferably no more than 20 mole percent, of the peroxide to prevent formation of two phases which may affect the stability of the ceramic component. If other terbium oxides are used, the mole percent must be adjusted to provide the amount of terbium as defined for the peroxide.

To the hafnia-terbium peroxide component may also be added a rare earth oxide consisting of from 3 to 10 mole percent $PrO_2$, 2 to 10 mole percent $Yb_2O_3$ or a mixture of up to 20 mole percent of the two in order to improve electronic conductivity of the ceramic component at MHD operating temperatures. In components containing either or both of these oxides, the terbium peroxide content should be limited to from 3 to 10 mole percent so that the total hafnia present may vary from 70 to 92 mole percent. The component should not contain more than a total of 20 mole percent $PrO_2$ and $Yb_2O_3$ combined to prevent an undesirable lowering of the melting temperature of the component.

The electrodes may be prepared from the ceramic component by an convenient method such as by sintering at high temperature or by hot pressing.

EXAMPLE I

A ceramic component of 10 mole percent terbium peroxide stabilized hafnia was prepared in the following manner: 8.49 gm of $Tb_4O_7$ was dissolved in 125 ml of hot concentrated HCl, diluted with 250 ml of water and combined with 50 ml of water containing 4.84 gm of $HfOCl_2.8H_2O$ and stirred until thoroughly mixed. A 20% ammonium hydroxide solution was slowly dripped into the hafnia-terbium solution with continuous stirring until a pH of 7 was attained. The particulates formed were recovered by vacuum filtering using a Buchner funnel and washed several times with distilled water to remove all the original solution. The particulate cake was mixed with about 40 ml of acetone, filtered through the Buchner funnel and washed with an additional 100 ml of acetone which acted to remove most of the water from the precipitate. The dewatered cake was then mixed thoroughly with about 400 ml of toluene and refiltered using additional toluene. The precipitate was once again washed with acetone to remove the last traces of water. The filtrate was then ground in a mortar and pestle heated to about 100° C. until the powder was dry, yielding a fine smooth powder which was then calcined in air for 4 hours at 950° C. to provide a total yield of 28 grams of ceramic component material containing 90 mole percent $HfO_2$ and 10 mole percent $Tb_4O_7$.

EXAMPLE II

A terbium-stabilized hafnia ceramic component containing $PrO_2$ and $Yb_2O_3$ was prepared in a manner similar to Example I by dissolving 1.77 grams $PrO_2$, 7.64 grams $Tb_4O_7$ and 4.03 grams $Yb_2O_3$ in 150 ml hot concentrated HCl, then diluted with 300 ml $H_2O$. 71.13 grams $HfOCl.8H_2O$ was dissolved in 86 ml $H_2O$. The two solutions were mixed together and neutralized with dilute ammonia water to coprecipitate the components as hydroxides which were then washed alternately in acetone, toluene, and acetone, using the technique described previously to remove the water. The dewatered precipitate was then dried before calcining in air at about 1000° C. to form a mixed oxide powder of 85 mole percent $HfO_2$, 5 mole percent $Tb_4O_7$, 5 mole percent $PrO_2$ and 5 mole percent $Yb_2O_3$.

EXAMPLE III

A number of tests were conducted on potential MHD electrode materials to evaluate their electrochemical reactions. The materials were tested in both liquid and vapor $K_2CO_3$ and $K_2SO_4$ as well as in potassium seeded coal slag. The electrode materials consisted of hot pressed and sintered bars of a number of different ceramic components including the components prepared as described in the previous examples.

The seed/slag electrolyte was contained in a Pt or $Al_2O_3$ crucible. The electrodes, as bars, were suspended from Pt wires in configurations of cathode, anode and control. The electrodes and controls were suspended above the thermally stabilized molten electrolyte, then lowered 0.3 cm into the electrolyte while monitoring the resistance. For most tests, the current densities, based upon the original immersed surface area, were estimated to be between 0.6 and 1.6 A/cm$^2$.

Reagent grade $K_2CO_3$ and $K_2SO_4$ were used as pure potassium salt melts. A synthetic slag having a composition as given in Table I was prepared from metallic oxides and carbonates. The slag was melted in platinum or $Al_2O_3$ crucibles and held at 1773° K. for at least 7 hours to ensure compositional homogeneity.

TABLE I

| Material | Montana Rosebud (mole %) |
| --- | --- |
| $SiO_2$ | 54.75 |
| $Al_2O_3$ | 14.28 |
| CaO | 17.91 |
| $Fe_2O_3$ | 3.37 |
| MgO | 7.86 |
| $TiO_2$ | 0.69 |
| $K_2O$ | 0.51 |
| $Na_2O$ | 0.44 |
| $P_2O_5$ | 0.19 |

The results of the studies comparing the electromechanical properties of the electrode materials are given in Table II below.

TABLE II

| Experiment No. | Electrolyte | Experimental Conditions | | | | | Corrosion Rates | | | | |
| --- | --- | --- | --- | --- | --- | --- | --- | --- | --- | --- | --- |
| | | $K_2O$ Mole % | $Fe_2O_3$ Mole % | Temp., °K. | Time, min | Total Coulombs | Moles/Coulombs, $(10^{-6})$ | | Wt. Loss, g/cm$^2$ hr | | Control |
| | | | | | | | Cathode | Anode | Cathode | Anode | |
| 25 $Fe_3O_4$ - 75 $MgAl_2O_4$: | | | | | | | | | | | |
| 28 | $K_2SO_4$ | — | — | 1423 | 60 | 360 | — | — | — | — | — |
| 21 | MR | 10 | 3 | 1723 | 64 | 368 | 1.4 | 1.2 | 0.1 | 0.1 | — |
| $La_{0.95}Mg_{0.05}CrO_3$: | | | | | | | | | | | |
| 6 | $K_2SO_4$ | — | — | 1373 | 67–82 | 402–492 | 1.2–1.5 | 4–4.7 | 0.2 | 0.5–0.6 | 0.01 |
| 29 | $K_2SO_4$ | — | — | 1379 | 15 | 90 | — | 4.7* | — | 0.9 | — |
| | | | | | 18 | 33 | — | 1.2 | — | 0.09 | — |
| 32 | $K_2SO_4$ | — | — | 1373 | 60 | 277 | 2.8 | — | 0.2 | — | — |
| | | | | | 60 | 778 | 1.9 | — | 0.4 | — | — |
| 9 | MR-1 | 10 | 3 | 1776 | 416 | — | — | — | — | — | 0.07 |
| 10 mole % $Tb_4O_7$ - 90 mole % $HfO_2$: | | | | | | | | | | | |
| 91 | $K_2SO_4$ | — | — | 1473 | 360 | 1620 | 0.02 | 0.02 | 0.1 | 0.1 | — |
| | | | | 1573 | 120 | 540 | | | | | |
| 10 mole % $Tb_4O_7$ - 90 mole % $HfO_2$: | | | | | | | | | | | |
| 99 | MR-1 | 10 | 3 | 1723 | 1080 | $6.5 \times 10^4$ | 0.01 | 0.02 | 0.01 | .01 | — |
| 5 mole % $PbO_2$ - 5 mole % $Yb_2O_3$ - 5 mole % $Tb_4O_7$ - 85 mole % $HfO_2$: | | | | | | | | | | | |
| 95 | $K_2SO_4$ | NA | NA | 1373 | 120 | 252 | 0.02 | 0.02 | 0.1 | 0.1 | 0.01 |

TABLE II-continued

| Experiment No. | Electrolyte | Experimental Conditions | | | | | Corrosion Rates | | | | |
| --- | --- | --- | --- | --- | --- | --- | --- | --- | --- | --- | --- |
| | | $K_2O$, | $Fe_2O_3$, | Temp., | Time, | Total | Moles/Coulombs, $(10^{-6})$ | | Wt. Loss, $g/cm^2$ hr | | |
| Mole % | Mole % | mole % | mole % | °K. | min | Coulombs | Cathode | Anode | Cathode | Anode | Control |
| 96 | $K_2SO_4$ | NA | NA | 1473 | 1080 | 6480 | 0.02 | 0.02 | 0.01 | 0.01 | — |
| 98 | MR-1 | 10 | 3 | 1723 | 1410 | 7439 | 0.4 | 0.3 | 0.03 | 0.03 | — |
| 8 mole % $Y_2O_3$ - 10 mole % $CeO_2$ - 82 mole % $HfO_2$: | | | | | | | | | | | |
| 5 | $K_2SO_4$ | NA | NA | 1373 | 280 | 4032 | 0.04 | 0.01 | 0.2 | 0.1 | 0.01 |

*Higher current densities by a factor of 2 or 3.

As can be seen from the table above, the terbium stabilized hafnia electrodes exhibited electrochemical resistance to attack by both $K_2SO_4$ and coal slag containing 10 mole percent $K_2O$ which is on the order of a magnitude more than any other ceramic components tested, thus providing a ceramic component for an electrode which should have many more hours of life when subjected to the environment within an MHD generator.

The embodiments of the invention in which an exclusive property or privilege is claimed are defined as follows:

1. An electrode for use in a MHD generator comprising: $HfO_2$ and a minor amount of $Tb_4O_7$, the $Tb_4O_7$ being present in an amount effective to stabilize at least 60 volume percent of the $HfO_2$ into the cubic structure.

2. The electrode of claim 1 wherein the $Tb_4O_7$ is present from 5 to 20 mole percent.

3. The electrode of claim 2 wherein the $Tb_4O_7$ is 10 mole percent.

4. The electrode of claim 1 wherein the $Tb_4O_7$ is present from 3 to 10 mole percent, and the electrode also contains a rare earth oxide selected from the group consisting of $PrO_2$, $Yb_2O_3$ and a mixture of $PrO_2$ and $Yb_2O_3$.

5. The electrode of claim 4 wherein the $PrO_2$ is present from about 3 to 10 mole percent and the $Yb_2O_3$ is present from about 2 to 10 mole percent.

6. The electrode of claim 5 wherein the component contains about 5 mole percent $Tb_4O_7$, about 5 mole percent $PrO_2$ and about 5 mole percent $Yb_2O_3$.

* * * * *